United States Patent [19]

Miescher

[11] 3,929,575

[45] Dec. 30, 1975

[54] METHOD OF PRODUCING GLUTAMIC ACID BY FERMENTATION

[75] Inventor: Guido M. Miescher, Terre Haute, Ind.

[73] Assignee: Commercial Solvents Corporation, Terre Haute, Ind.

[22] Filed: Oct. 2, 1974

[21] Appl. No.: 504,943

[52] U.S. Cl. .................... 195/30; 195/29; 195/47
[51] Int. Cl.² ...................................... C12D 13/06
[58] Field of Search ...................... 195/30, 29, 47

[56] References Cited
UNITED STATES PATENTS
3,766,010  10/1973  Ikeda et al. ........................ 195/30

Primary Examiner—Alvin E. Tanenholtz
Attorney, Agent, or Firm—Robert H. Dewey; Howard E. Post

[57] ABSTRACT

An improved method of producing glutamic acid by fermentation whereby rapid growth of the glutamic acid-producing organism is promoted at the start of the fermentation by the steps of using ammonium acetate in the medium and maintaining the $CO_2$ content of the exhaust air at a concentration of 6.5% or less.

2 Claims, No Drawings

METHOD OF PRODUCING GLUTAMIC ACID BY FERMENTATION

BACKGROUND OF THE INVENTION

This invention generally relates to a process for the production of glutamic acid by fermentation. In a particular aspect it relates to an improved nutrient medium for production of glutamic acid by fermentation.

Glutamic acid is produced in high yields by the fermentation of nutrient media with certain glutamic acid-producing strains of microorganisms. A satisfactory method for the production of glutamic acid is described in U.S. Pat. No. 2,978,383 and U.S. Pat. No. 2,978,384, both issued on Apr. 4, 1961, to Koichi Yamada. This method utilized an aqueous nutrient medium comprising a carbohydrate source, a nitrogen source, a phosphate source, a potassium source, a magnesium source, and trace amounts of mineral salts. Briefly, the process for the production of glutamic acid involved cultivating a glutamic acid-producing microorganism, in an aqueous nutrient medium containing the above-mentioned ingredients. The fermentation is preferably carried out at temperatures ranging from about 30° to about 40°C at a pH ranging from about 6 to about 9 under submerged conditions of agitation and aeration. The organisms of the genera Bacillus, Micrococcus, Brevibacterium, Microbacterium, Corynebacterium Arthrobacter, and the like may be used as the glutamic acid-producing microorganism to produce glutamic acid as is described in the art.

U. A. Phillips in U.S. Pat. No. 3,227,625 disclosed an improvement in this process wherein the carbohydrate was replaced, in part or entirely, with acetic acid at a concentration of 20– g/liter. The acetic acid was in the form of ammonium acetate, 10–14 g/l and an alkali metal acetate, 10–14 g/l. According to Phillips the ammonium acetate could be used to supply a part of the nitrogen source or all of it. After 48 hours fermentation the yield was 72.7% based on the acetic acid, which can be calculated to be equivalent of 16 g/l of glutamic acid.

SUMMARY OF THE INVENTION

It is an object of this invention to provide an improved process for the production of glutamic acid.

It is another object of this invention to provide an improved nutrient medium for the production of glutamic acid by fermentation.

Other objects will be apparent to those skilled in the art from the description herein.

It has now been discovered that a combination of process improvement steps unexpectedly provides very high yields of glutamic acid at shortened fermentation time. It has been discovered that the presence of ammonium acetate at concentrations significantly less than taught by Phillips, provides a fast start of growth of the organism which leads to an earlier start of glutamic acid synthesis at a higher production rate than the previous processes. During the fermentation the carbon dioxide content of the exhaust gas is monitored to prevent it rising above 6.5% by volume. Yields of as much as 100–110 g/l are obtained in 30–35 hours. This high yield is very surprising and unexpected, especially in such a short fermentation time.

DETAILED DESCRIPTION

In the process of the present invention, a conventional nutrient fermentation medium consisting of a carbohydrate source, (preferably glucose), a nitrogen source, a phosphorous source, a growth factor, and trace minerals, e.g. magnesium, iron and manganese, is employed as the base. When glucose is used as the carbohydrate, a growth starter — carmelized glucose as described by Miescher in U.S. Pat. No. 3,156,627 is used. However, any carbohydrate source known in the art can be used in place of glucose. One suitable source is corn sugar molasses.

The fermentation is conducted in the presence of ammonium acetate at a concentration of about 3–7 g/liter (equivalent to 2.34–5.45 g/liter of acetic acid) preferably 5 g/liter (equivalent to 3.9 g/liter of acetic acid). The ammonium ion from the ammonium acetate along with the ammonia used for pH adjustment is used as the nitrogen source. The acetate ion is usable as a carbon source, but the amount present is insignificant compared to the glucose content.

The growth factor employed can be biotin as known or preferably oleic acid, as disclosed by Miescher, U.S. Pat. No. 3,326,775. The amount of oleic acid used is in the range of 1–10 ml per 10 liters, but preferably 5–6 ml/10 l.

The fermentation generally is conducted in accordance with the prior art. The temperature is held at about 32°C for the first 14 hours and is then raised to about 38°C as disclosed by Miescher, U.S. Pat. No. 3,123,537. A high degree of agitation is used to insure thorough aeration of the medium during the fermentation, and the $CO_2$ content of the exhaust gas is maintained at below 6.5%, preferably below 4.5%.

Analyses are made periodically for pH, carbohydrate content, and glutamic acid content for the remainder of the fermentation. The carbohydrate content is maintained at a concentration of from about 1% to about 3% by incremental addition of a glucose solution. Typically about 2,250 ml of a solution containing about 1600 g of glucose is required to complete the fermentation, so that typically about 2810 g of carbohydrate is utilized. The pH of the fermentor contents is maintained at about 7.8 by the automatic addition of anhydrous ammonia. Hourly analyses indicate when glutamic acid production reaches a maximum. At this point fermentation is complete and the glutamic acid is ready to be harvested.

The invention will be better understood with reference to the following examples. It is understood, however, that the examples are intended for illustration only and it is not intended that the invention be limited thereby.

EXAMPLE 1

Part A

Brevibacterium divaricatum NRRL B-2311 was cultivated for 16 hours at 35°C on a rotary shaker at 385 r.p.m. in a seed culture medium of the following composition:

| | |
|---|---|
| Glucose | 40 g |
| $K_2HPO_4$ | 1 |
| $MgSO_4 \cdot 7H_2O$ | 0.5 |
| BYF-100 (yeast extract) | 1 |
| Urea | 8 |
| Tap water | 1000 ml |

A fermentation medium was prepared with the following ingredients:

| | |
|---|---|
| Glucose | 1210 g |
| $KH_2PO_4$ | 12 |
| $K_2SO_4$ | 12 |
| $MgSO_4$ (anhydrous) | 6 |
| $FeSO_4 \cdot 7H_2O$ | 6 ppm. |
| $MnSO_4 \cdot H_2O$ | 6 ppm. |
| Tap water to make | 4800 ml |
| Anti-foam agent | 1 ml |

The anti-foam agent used was a polypropylene glycol type compound marketed by Hodag Chemical Co. under the designation Hodag K-67.

This medium was sterilized by heating for 30 min. at 15 psig of steam. To it was added the following:

| | |
|---|---|
| Ammonium acetate | 50 g |
| Tap water | 5000 ml |

This portion was sterilized as described above and to it was added the following growth starter which had been sterilized by heating for 20 min. at 15 psig of steam:

| | |
|---|---|
| Corn sugar molasses | 60 g |
| Water | 60 ml |
| Adjust with $NH_3$ to pH | 8.3 |

The mixture prepared as above was cooled to 32°–33°C and transferred to a fermentor equipped with an agitator, a temperature controller, an automatic pH controlled system and a $CO_2$ detector to monitor the $CO_2$ content of the exhaust gas. Aeration was provided by introducing compressed, sterile air at the bottom of the fermentor through a sparger.

Agitation was begun and 600 ml of the seed culture prepared as described above was added to the fermentation medium. The pH was adjusted to 8.5 with ammonia and 6.5 ml oleic acid was added. The automatic pH control system was then set to maintain a pH of about 7.8. The $CO_2$ content of the exhaust gas was at all times held below 6.5% (by vol.) and usually not above 4.5% by adjusting the air flow. After 14 hours the temperature was raised to 38°C in accordance with Miescher U.S. Pat. No. 3,123,537 and additional glucose feeding was commenced when the glucose content in the medium fell below 0.5–2% by incrementally adding a sterilized solution of 1600 g of glucose dissolved in sufficient tap water to make 2250 ml. The glucose was introduced at the rate of 5 ml at every 2 min. interval to the end of the fermentation.

The glutamic assay production was monitored by periodical assay. After 28.5 hours the fermentation was complete at a yield of about 100 g/liter.

Part B

The foregoing experiment was repeated in all essential details except that a solution of urea, 20 g in 5000 ml of water, was substituted for ammonium acetate and 5.5 ml of oleic acid was used. The $CO_2$ content was not monitored and the air flow remained constant. After 29 hours of fermentation glutamic acid production was 75 g/liter and at 36 hours it was only 83 g/liter. Accordingly the fermentation was judged to be complete.

EXAMPLE 2

Part A

The experiment of Example 1, Part A, was repeated in all essential details except that the glucose, 900 g, was supplied by corn sugar molasses (the concentrated mother liquor obtained from corn sugar after 2 or 3 crops of glucose have been removed), and the growth starter was eliminated. Also the amount of oleic acid used was reduced to 5.5 ml. The temperature was raised to 38°C after 13 hours and the additional glucose feed consisting of 2600 g of corn sugar molasses made up to 2800 ml with tap water and containing 1300 g of glucose was commenced at 16.5 hours at the rate of 5.3 ml every 1.4 minutes. The air pressure was varied to maintain the $CO_2$ level below 6%. After about 36 hours, production of glutamic acid had leveled off at 94 g/liter and the fermentation was judged to be complete.

Part B

The experiment of Part A was repeated in all essential details except that 20 g of urea was substituted for the ammonium acetate, the oleic acid was reduced to 5.0 ml, and the amount of glucose was 700 g instead of 900 g. The glucose feed consisted of 2400 g of corn sugar molasses containing 1200 g of glucose made up to 2700 ml with tap water. The temperature was raised to 38° after 13 hours fermentation and glucose feeding commenced at 14 hours at the rate of 6.5 ml every 2 minutes. After 47 hours the production of glutamic acid had leveled off at about 75 g/liter and the fermentation was judged to be complete.

I claim:

1. In a process for the production of glutamic acid by cultivating the glutamic-acid producing organism Brevibacterium divaricatum on a nutrient fermentation medium consisting of a carbon source, a nitrogen source, essential minerals and a growth factor, while maintaining the carbon dioxide concentration in the exhaust gas below 6.5% during the fermentation, the improvement consisting of using ammonium acetate in the medium at a concentration of 3–7 g per liter.

2. The process of claim 1 wherein the concentration of ammonium acetate is about 5 g per liter.

\* \* \* \* \*

UNITED STATES PATENT OFFICE
CERTIFICATE OF CORRECTION

Patent No. 3,929,575          Dated December 30, 1975

Inventor(s) Guido M. Miescher

It is certified that error appears in the above-identified patent and that said Letters Patent are hereby corrected as shown below:

Column 1, line 37, "20- g/liter" should read -- 20-29 g/liter --.

Signed and Sealed this

Seventeenth Day of May 1977

[SEAL]

Attest:

RUTH C. MASON
*Attesting Officer*

C. MARSHALL DANN
*Commissioner of Patents and Trademarks*